US009693341B2

(12) United States Patent
Miao et al.

(10) Patent No.: US 9,693,341 B2
(45) Date of Patent: Jun. 27, 2017

(54) PHYSICAL UPLINK CONTROL CHANNEL OPTIMIZATION

(71) Applicant: NOKIA SOLUTIONS AND NETWORKS OY, Espoo (FI)

(72) Inventors: De Shan Miao, Beijing (CN); Alfredo Rocchetti, Munich (DE); Lei Du, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 20 days.

(21) Appl. No.: 14/401,169

(22) PCT Filed: May 15, 2013

(86) PCT No.: PCT/EP2013/060019
§ 371 (c)(1),
(2) Date: Nov. 14, 2014

(87) PCT Pub. No.: WO2013/171256
PCT Pub. Date: Nov. 21, 2013

(65) Prior Publication Data
US 2015/0098406 A1   Apr. 9, 2015

Related U.S. Application Data

(60) Provisional application No. 61/647,102, filed on May 15, 2012.

(51) Int. Cl.
H04W 4/00 (2009.01)
H04W 72/04 (2009.01)
H04L 5/00 (2006.01)

(52) U.S. Cl.
CPC ....... H04W 72/0413 (2013.01); H04L 5/0007 (2013.01); H04L 5/0053 (2013.01); H04L 5/0064 (2013.01)

(58) Field of Classification Search
None
See application file for complete search history.

(56) References Cited

U.S. PATENT DOCUMENTS

2011/0134774 A1* 6/2011 Pelletier .............. H04W 52/365 370/252
2011/0165906 A1* 7/2011 Papasakellariou .... H04L 1/1692 455/522

(Continued)

FOREIGN PATENT DOCUMENTS

WO    WO 2011/085230 A2    7/2011

OTHER PUBLICATIONS

International Search Report and Written Opinion dated Aug. 13, 2013 corresponding to International Patent Application No. PCT/EP2013/060019.

(Continued)

Primary Examiner — Zewdu A Beyen
(74) Attorney, Agent, or Firm — Squire Patton Boggs (US) LLP

(57) ABSTRACT

Communication systems, such as the long tem evolution (LTE) of the third generation partnership project (3GPP) may benefit from various optimizations, such as optimizations related to smart phone technology. More particularly, diverse data applications may benefit from enhancements such as physical uplink control channel optimization. According to certain embodiments, a method can include configuring, with radio resource control signaling, a physical uplink control channel resource to one or more devices. The method can also include indicating to each device of the one or more devices, which part of the resource to use.

23 Claims, 7 Drawing Sheets

(56) References Cited

U.S. PATENT DOCUMENTS

| | | | |
|---|---|---|---|
| 2012/0039275 A1* | 2/2012 | Chen | H04L 1/1607 370/329 |
| 2012/0093096 A1* | 4/2012 | Barbieri | H04J 3/1694 370/329 |
| 2012/0113831 A1* | 5/2012 | Pelletier | H04L 5/0058 370/252 |
| 2013/0034071 A1 | 2/2013 | Lee et al. | |
| 2013/0083741 A1* | 4/2013 | Larsson | H04L 5/0094 370/329 |

OTHER PUBLICATIONS

Research in Motion UK Ltd. et al., "Work Item Proposed Update for LTE RAN Enhancements for Diverse Data Applications," 3GPP TSG RAN Meeting #53, RP-111372, Sep. 13, 2011, 11 pages.

Nokia Siemens Networks et al., "PUCCH Analysis for EDDA," 3GPP TSG-RAN WG2 Meeting #77bis, R2-121202 (R2-120189), Mar. 19, 2012, 3 pages.

Renesas Mobile Europe, "PUCCH Improvements for Diverse Data Applications," 3GPP TSG-RAN WG2 Meeting #77, R2-120580, Dresden, Germany, Feb. 6-10, 2012, 2 pages.

Huawei et al., "Improving the Trade-Off Between SR Delay and Uplink Resource Usage," 3GPP TSG-RAN WG2 Meeting #77, R2-120503, Dresden, Germany, Feb. 6-10, 2012, 3 pages.

3GPP TS 36.331 V10.1.0 (Mar. 2011), Technical Specification, 3rd Generation Partnership Project; Technical Specification Group Radio Access Network; Evolved Universal Terrestrial Radio Access (E-UTRA); Radio Resource Control (RRC); Protocol Specification (Release 10), Mar. 30, 2011, 290 pages.

3GPP TS 36.331 V10.5.0 (Mar. 2012), Technical Specification, 3rd Generation Partnership Project; Technical Specification Group Radio Access Network; Evolved Universal Terrestrial Radio Access (E-UTRA); Radio Resource Control (RRC); Protocol Specification (Release 10), Mar. 2012, 302 pages.

Research in Motion UK Limited, "Text Proposal for TR 36.822: Resource Usage for SR," 3GPP TSG-RAN WG2 Meeting #77bis, R2-121611, Jeju, South Korea, Mar. 26-30, 2012, 4 pages.

Huawei, "Sharing PUCCH-SR," 3GPP TSG RAN WG2 Meeting #68bis, R2-100207, Valencia, Spain, Jan. 18-22, 2010, 4 pages.

Nokia Siemens Networks et al., "PUCCH Analysis for EDDA," 3GPP TSG-RAN WG2 Meeting #78, R2-122699, Prague, Czech Republic, May 21-25, 2012, 4 pages.

* cited by examiner

FIG 1
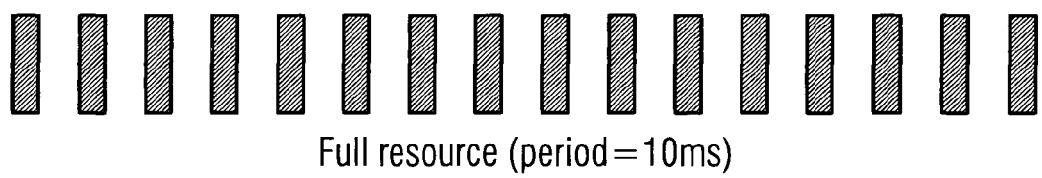
Full resource (period=10ms)
Even resource (COMMAND=01)
Odd resource (COMMAND=10)

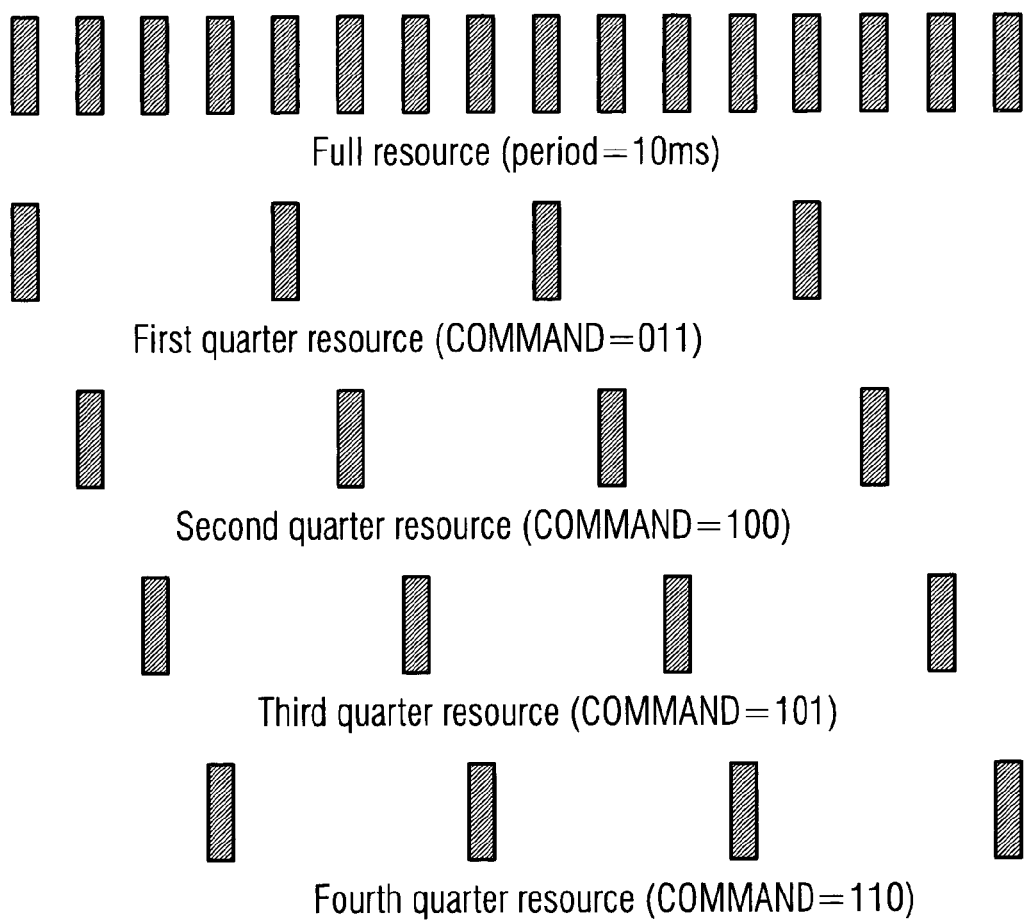

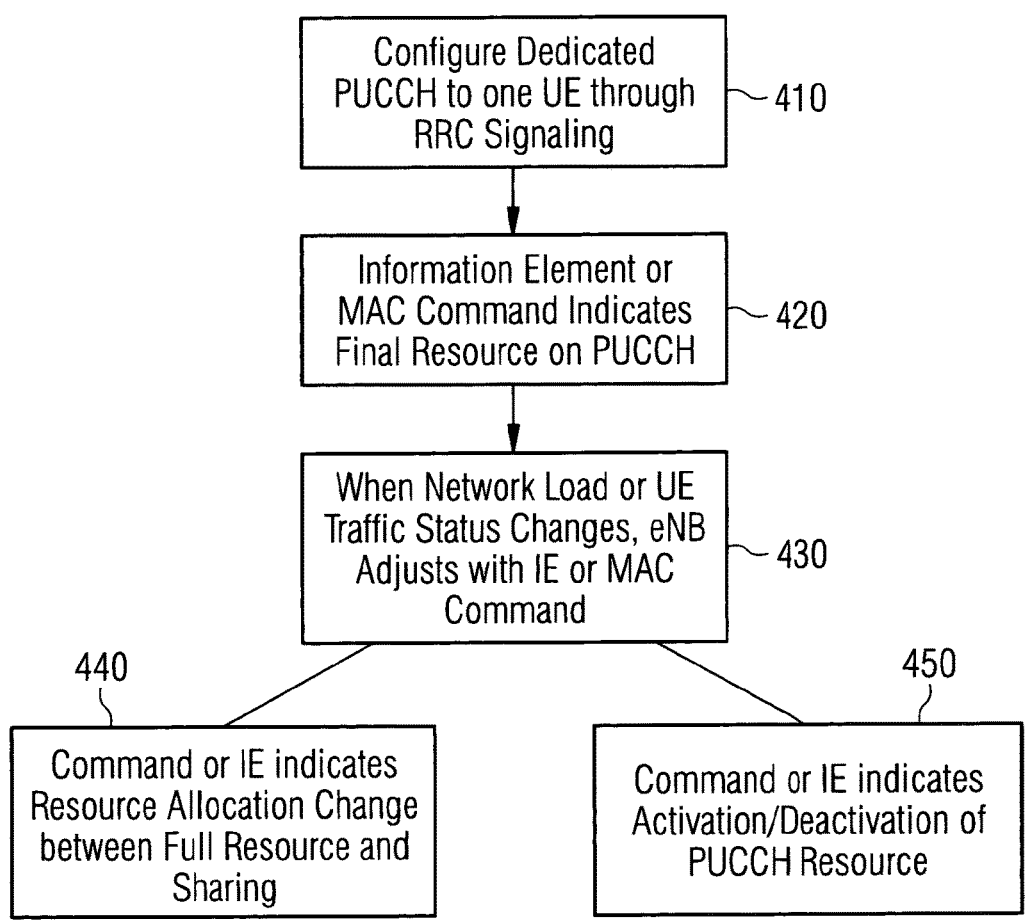

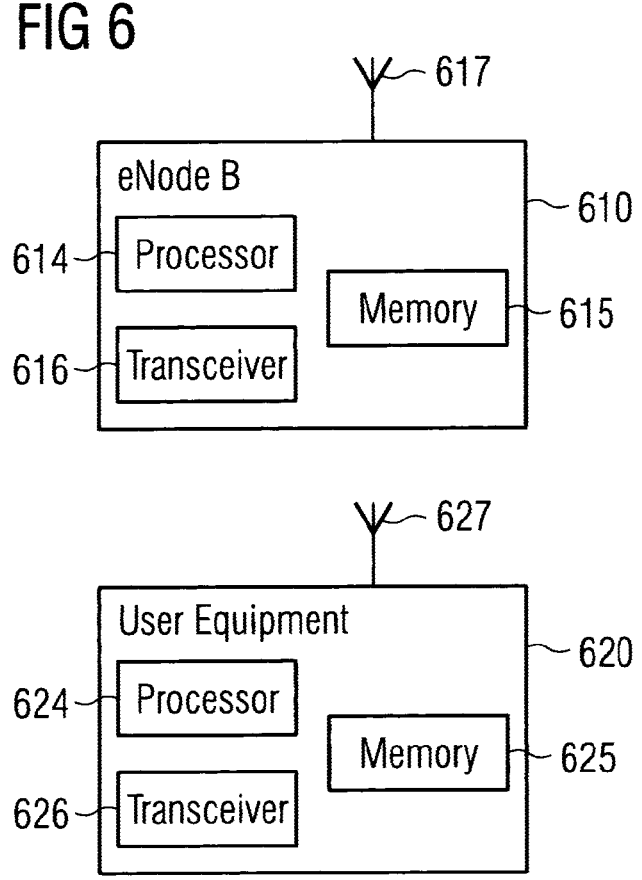

PHYSICAL UPLINK CONTROL CHANNEL OPTIMIZATION

CROSS-REFERENCE TO RELATED APPLICATION

This application is related to and claims the priority of U.S. Provisional Patent Application No. 61/647,102 filed May 15, 2012, which is hereby incorporated herein by reference in its entirety.

BACKGROUND

Field

Communication systems, such as the long term evolution (LTE) of the third generation partnership project (3GPP) may benefit from various optimizations, such as optimizations related to smart phone technology. More particularly, diverse data applications may benefit from enhancements such as physical uplink control channel optimization.

Description of the Related Art

LTE radio access network (RAN) enhancements for diverse data applications can include, for example, providing improved always-on connectivity. For example, mechanisms at the RAN level may be needed to enhance the ability of LTE to handle diverse traffic profiles. Under such traffic loads, the improvements may allow for better trade-offs to be achieved when balancing the needs of network efficiency, UE battery life, signaling overheads, and user experience/system performance.

In current LTE systems, a physical uplink control channel (PUCCH) resource allocation is configured by a radio resource controller (RRC) in semi-static way. For example, the RRC reconfiguration message may take up to tens or one hundred milliseconds to take effect. Once configured, the allocated resource is reserved and can conventionally be changed only via RRC reconfiguration, which is at the cost of RRC signaling. In practice, such RRC reconfiguration procedure happens rarely, even when user equipment (UE) traffic characteristic is changed, to avoid signaling overhead.

For example, scheduling request (SR) resource can be configured by an evolved Node B (eNB) in an initial stage after an RRC establishment procedure. If a long periodicity is configured, the configured periodicity may not fit if real-time application starts, such as voice over internet protocol (VoIP) or gaming. Otherwise if a short periodicity is configured, most of SR resource may be wasted. RRC reconfiguration can be used to adjust PUCCH configuration. In certain cases, however, RRC reconfiguration requires changing cell-specific parameters, such as physical resource block (PRB) numbers of channel quality indicator (CQI), to meet the demands. Such a change will impact all UEs in the cell and can potentially cause a significant effect on throughput during the transition phase. RRC reconfiguration thus can lead to reconfiguring a large number of user equipment (UEs) in a relatively short window of time.

3GPP has a variety of approaches for providing PUCCH usage efficiency. One way is to extend periodicity. Another way is to provide a sharing mechanism whereby the same SR resource is allocated to multiple UEs. This approach assumes that each UE may have only a few packets transmission in background services. If multiple UEs happen to transmit a data packet at the same time, user contention over the same PUCCH resource and collisions may occur. In this case, the eNB may be unable to identify which UE is transmitting the SR signal, leading to the need for a contention resolution mechanism.

Another approach is discontinuous reception (DRX) CQI masking, as described in 3GPP technical specification (TS) 36.331, which is hereby incorporated herein by reference. When a UE works in DRX mode, CQI transmission can be disabled in off-duration. This can permit another UE to transmit a CQI signal during the off-duration of the DRX-mode UE. In this way, multiple UEs can share a same CQI resource.

A further approach is PUCCH release with time alignment timer (TAT) configuration. In Release 8 (Rel-8), one timer, TimeAlignementTimer, is used to control UL synchronization. Before TAT expiry, the UE can be indicated a new time advanced (TA) value to keep UL synchronization. If TA has not been updated until TAT is expired, this UE can enter out-of-sync mode, and can then release PUCCH resource. The eNB could set a small value for TAT to force UE into out-of-sync mode. For example, a minimum TAT value of 500 ms can be set.

SUMMARY

According to certain embodiments, a method may include configuring, with radio resource control signaling, a physical uplink control channel resource to one or more devices. The method may also include indicating to each device of the one or more devices, which part of the resource to use.

In certain embodiments, an apparatus may include at least one processor and at least one memory including computer program code. The at least one memory and the computer program code are configured to, with the at least one processor, cause the apparatus at least to configure, with radio resource control signaling, a physical uplink control channel resource to one or more devices. The at least one memory and the computer program code are configured to, with the at least one processor, cause the apparatus at least to indicate to each device of the one or more devices, which part of the resource to use.

An apparatus, according to certain embodiments, may include means for configuring, with radio resource control signaling, a physical uplink control channel resource to one or more devices. The apparatus may also include means for indicating to each device of the one or more devices, which part of the resource to use.

A non-transitory computer readable medium, in certain embodiments, may be encoded with instructions that, when executed in hardware, perform a process. The process may include configuring, with radio resource control signaling, a physical uplink control channel resource to one or more devices. The process may also include indicating to each device of the one or more devices, which part of the resource to use.

BRIEF DESCRIPTION OF THE DRAWINGS

For proper understanding of the invention, reference should be made to the accompanying drawings, wherein:

FIG. 1 illustrates three resource modes according to certain embodiments.

FIG. 2 illustrates seven resource modes according to certain embodiments.

FIG. 4 illustrates a method according to certain embodiments.

FIG. 6 illustrates a system according to certain embodiments.

DETAILED DESCRIPTION

Figure 3A:
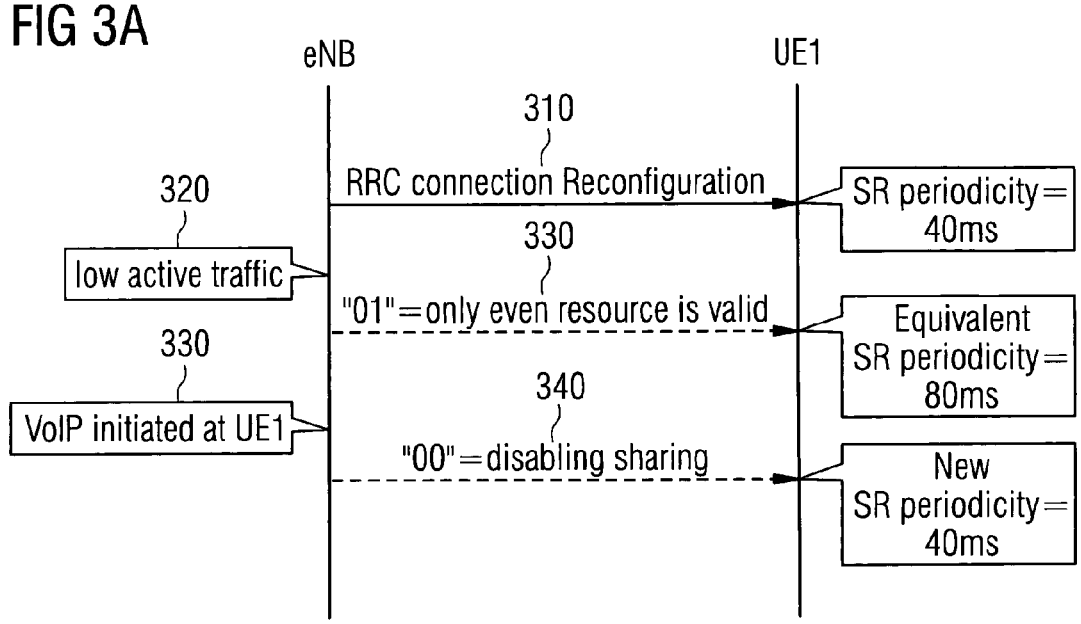
FIGS. 3A and 3B provide exemplary signaling sequences showing how the SR periodicity can be changed from 40 ms to 80 ms and vice versa, according to certain embodiments.

While radio resource control (RRC) signaling can be used for semi-static configuration, certain embodiments provide a faster and more agile signaling with reduced overhead compared to actual RRC-based implementations.

For example, certain embodiments relate to physical uplink control channel (PUCCH) resource allocation. According to certain embodiments, one PUCCH resource (for example, channel quality indicator CQI, scheduling request SR resource or acknowledgment/negative acknowledgment (ACK/NACK) resource) can be configured with radio resource control (RRC) signaling to two (or several) UEs and a Medium Access Control (MAC) Information element can be used to indicate to the UEs which part of the resource (for example, even/odd half of the resource) to use. More specifically, the invention introduces a mechanism for allocating partial resources by adjusting the periodicity of the PUCCH resource, and activating/deactivating them using an information element or command.

Enhancements for diverse data applications (EDDA) optimization can variously include signaling load reduction, power saving and system efficiency improvement. In LTE, PUCCH carries ACK/NACK, CQI and SR. Certain embodiments, therefore, are related to PUCCH configuration optimization, and can improve PUCCH usage efficiency and signaling.

For example, certain embodiments provide a method to allocate PUCCH resources flexibly. One aspect of certain embodiments is an information element/command that indicates PUCCH resource share and its activation/deactivation with respect to the UE. FIG. 4 illustrates a method according to certain embodiments.

As shown in FIG. 4, at 410, an eNB can configure a dedicated PUCCH resource to one UE through RRC signaling. Additionally, an information element or a MAC command can be used, at 420, to indicate final resource of PUCCH. In some embodiments, the information element may also be transmitted within the MAC command. Alternatively, another command suitable for signaling the resource allocation to the UE may be used. If the UE has not received this command, the assigned PUCCH resource can follow RRC configuration. However, if the UE has received this command, assigned PUCCH resource may follow this new indication. The PUCCH resource may comprise, for example, physical resource blocks (PRB) in a frequency domain.

When UE traffic status changes or network load changes, at 430, eNB can adjust a UE's PUCCH resource allocation with an information element (IE) or MAC command. The time of sending the information element (IE) or MAC command may thus depend on the system load, traffic information, and the like. Moreover, at 440, this command can support PUCCH resource allocation from full resource status to shared resource status, as well from shared resource status to full resource status. Additionally, at 450, the command can be used to trigger activation and/or deactivation of the PUCCH resource. The command may trigger deactivation of the PUCCH resource, for example by forcing a time alignment timer to expire. After receiving this command, UE may follow the existing behavior defined for the time alignment timer expiry, namely to release the PUCCH and enter out-of-sync mode.

Figure 5A:
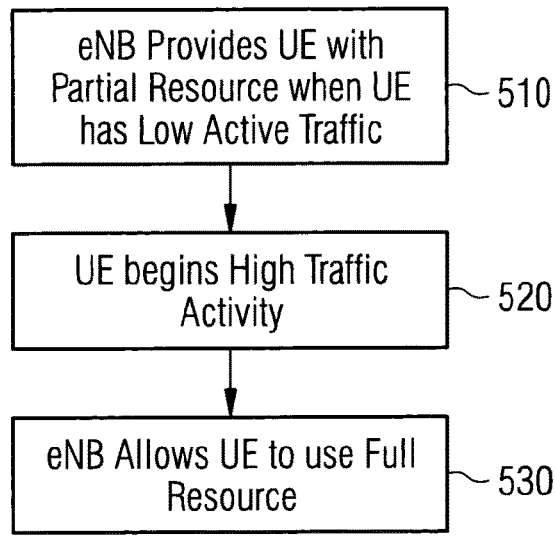
FIG. 5A illustrates a traffic status change use case according to certain embodiments.

Various uses of certain embodiments are possible. For example, certain embodiments can address a traffic status change as shown in FIG. 5A. At 510, an eNB can provide a UE with a partial resource when the UE has low active traffic. At 520, the UE can begin high traffic activity, such as VoIP or gaming. Accordingly, at 530, the eNB can allow this UE to use the full assigned resource. On the contrary, PUCCH resource allocation could be changed from full resource to partial resource.

Figure 5B:
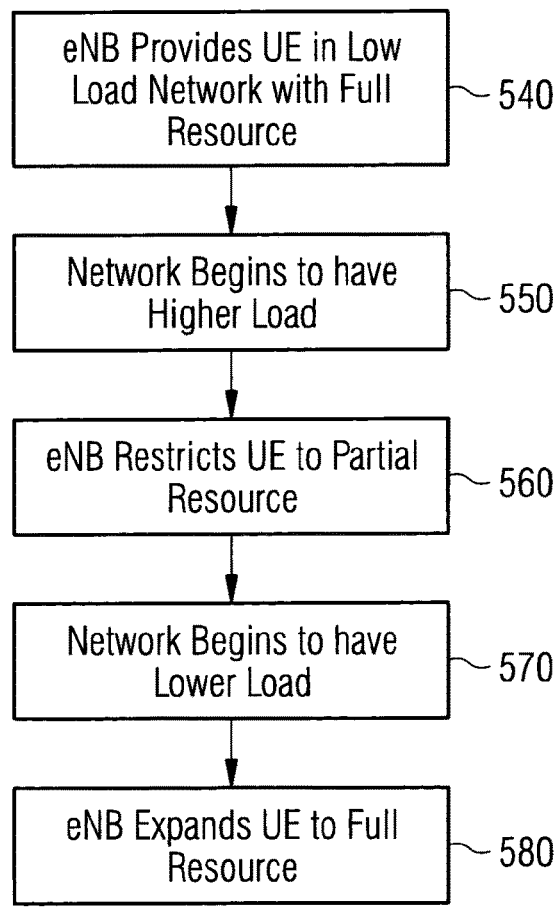
FIG. 5B illustrates a network load change use case according to certain embodiments.

FIG. 5B, by contrast illustrates a network load change use case. At 540, an eNB allocates one UE with a full resource. The network can begin to have a higher load at 550. Then, at 560, the eNB can starts to reduce the resource of the UE, in order to admit other UEs in the cell, while providing the new UEs the uplink (UL) signaling resources it needs. On another hand, if network load decreases at 570, PUCCH resource allocation could be changed from shared state into full resource state, at 580.

Certain embodiments can provide, using the above information element or MAC command, fast and dynamic resource allocation according to quality of service (QoS) and network load. Certain embodiments can also provide signaling overhead reduction, especially RRC signaling overhead related to reconfigurations. Certain embodiments can avoid/minimize the need of broadcasting new PUCCH configurations with consequent drawbacks in the transition phase. Moreover, certain embodiments can allow multiple users to share same allocation of PUCCH resources. Furthermore, certain embodiments can trigger the activation or deactivation of PUCCH resources.

Certain embodiments can be implemented in various ways. One simple implementation mechanism is using a few bits to indicate PUUCH resource (such as CQI resource) allocation. For example, in one embodiment 0 represents an even part of the resource and 1 represents an odd part of the resource. Additional information can be used for disabling this sharing allocation and for normal full resource allocation. Total information bits number is 2, in this case. Table 1 illustrates this command:

TABLE 1

| | |
|---|---|
| 00 | Disable sharing(full resource) |
| 01 | Even resource |
| 10 | Odd resource |
| 11 | Null or stopping CQI reporting or CQI resource deactivation |

As a special configuration, a MAC command can be used to deactivate the CQI resource of one UE when the UE has been allocated to one resource via RRC signaling or MAC command. This resource can be released and allocated to another UE. Furthermore, if the resource has been deactivated, it also could be activated via this MAC command. As shown in table 1, the first three entries could be seen as the CQI resource activation, the fourth entry could be used to deactivate the CQI resource.

Based on the activation and deactivation of CQI resource, one possible resource allocation mode is the combination of RRC signaling and MAC command. For example, in a particular case, RRC signaling is used to allocate a certain physical resource for one UE, while a MAC command is used to trigger the activation of this resource share. Hence, this mechanism allows overbooking this resource for multiple UEs.

FIG. 1 illustrates three resource modes according to certain embodiments. As shown in FIG. 1, full resource state in this case means that a periodic CQI resource with 10 ms period has been assigned to one UE. Even half and odd half can be separated out from a full resource. Furthermore, in some embodiments, another share or part of the resource can be assigned to one UE.

FIG. 2, on the other hand, illustrates seven resource modes according to certain embodiments. As an enhancement of two bit indication, eNB can use two steps indications to assign a quarter of one PUCCH resource. For example, in the first step "01" could represent even half of one resource. In the second step, two bits "01" could further indicate even half of assigned half resource in last step. Similarly, two bits "10" could further indicate the odd half of assigned half resource in last step.

If finer allocation is allowed, more information bits can be used for addressing it. For example, when 2 bits are used, 00 can mean first quarter, 01 can mean second quarter, 10 can mean third quarter, and 11 can mean fourth quarter. An additional disabled status can also be indicated. Furthermore, a three bit command can include two bit items to be more complete. Table 2 provides an example, where the first seven entries could be seen as the CQI resource activation, the eighth entry could be used to deactivate the CQI resource:

TABLE 2

| | |
|---|---|
| 000 | Disable sharing(full resource) |
| 001 | Even half |
| 010 | Odd half |
| 011 | First quarter resource |
| 100 | Second quarter resource |
| 101 | Third quarter resource |
| 110 | Fourth quarter resource |
| 111 | Null or stopping CQI reporting or CQI resource deactivation |

In FIG. 2, one full resource is divided into four parts evenly. Three bits could be used to indicate all possible combinations, as shown above in Table 2.

Not only can CQI be allocated with this mechanism, but also SR or other physical uplink control channel resource allocation can also be performed. Thus, SR resource pace can be adjusted to fit for network load and traffic status. Similar two bit commands for SR resources are shown in Table 3:

TABLE 3

| | |
|---|---|
| 00 | Disable sharing |
| 01 | Even resource |
| 10 | Odd resource |
| 11 | Null or stopping SR tranmission or SR resource deactivation |

A combined signal format can be provided, which can control CQI and SR resource allocation simultaneously:

| CQI control | SR control | TAT expiry |
|---|---|---|

This command signal can include three fields: one is for CQI control, a second is for SR control, and the last field can be used to release a PUCCH resource. When TAT expiry is enabled, the UE can release all assigned PUCCH resources.

Figure 3B:
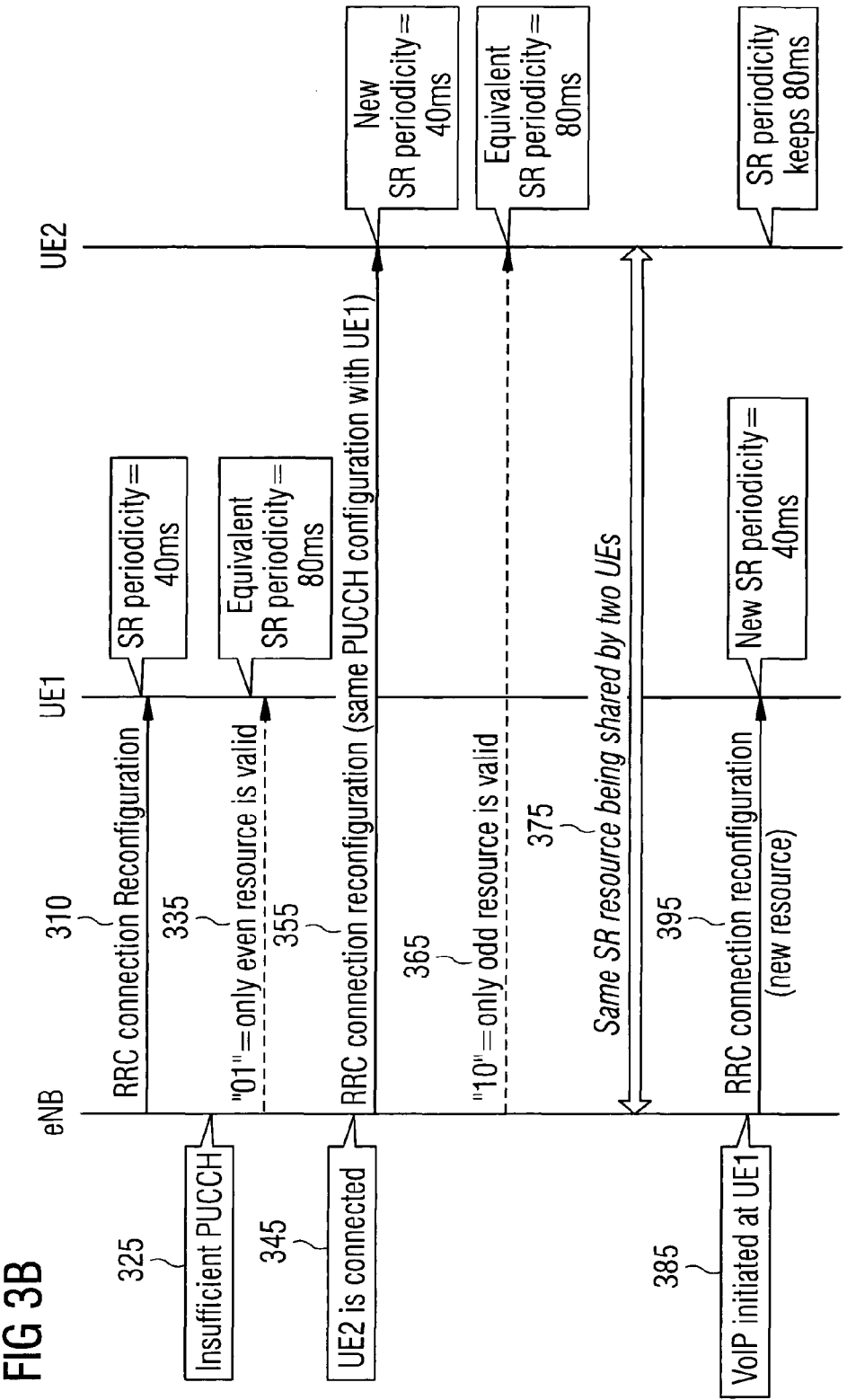

FIGS. 3A and 3B illustrate exemplary signaling sequences showing how the SR periodicity can be changed from 40 ms to 80 ms and vice versa, according to certain embodiments.

FIG. 3A illustrates a single user reconfiguration case. As shown in FIG. 3A, initial RRC connection configuration or reconfiguration can take place at 310 between an eNB and UE1. Under this configuration, the SR period may be 40 ms. Then, the eNB can detect that UE1 has only low active traffic, at 320. Therefore, the eNB can, at 330, send a designation "01," which can indicate that UE1 is only to use the even resources. Thus, the effective or equivalent SR period is now 80 ms.

Later, at 330, the eNB may detect that VoIP is initiated at UE1. In this case, the eNB can send a designation "00" at 340, which can disable sharing, restoring the UE1 to an SR period of 40 ms.

FIG. 3B illustrates a two users sharing case. As shown in FIG. 3B, initial RRC connection configuration or reconfiguration can take place at 310 between an eNB and UE1. Then, at 325, the eNB can detect that there is insufficient PUCCH. Therefore, the eNB can send an indication of "01," to inform UE1 that only even resources are valid. With such configuration, the remaining part of the PUCCH resources may be allocated to other user(s). After that, UE2 can connect to the network at 345. At the 355, the eNB can use RRC connection configuration/reconfiguration, an information element or a MAC command to give UE2 the same PUCCH configuration as UE1.

Then, at 365, the eNB can inform UE2 using an indication of "10," that UE2 is only to use the odd resource. After that, at 375, UE1 and UE2 can share a same resource. At 385, the eNB may detect that VoIP has been initiated at UE1. Therefore, at 395, the eNB can reconfigure UE1 to use a new resource that is not shared with UE2.

FIG. 6 illustrates a system according to certain embodiments of the invention. In one embodiment, a system may include several devices, such as, for example, eNB 610 and UE 620. The system may include more than one UE 620, although only one is shown for the purposes of illustration. Each of these devices may include at least one processor, respectively indicated as 614 and 624. At least one memory is provided in each device, and indicated as 615 and 625, respectively. The memory may include computer program instructions or computer code contained therein. Transceivers 616 and 626 are provided, and each device may also include an antenna, respectively illustrated as 617 and 627. Other configurations of these devices, for example, may be provided. For example, eNB 610 and UE 620 may be configured for wired communication, rather than wireless communication, and in such a case antennas 617 and 627 would illustrate any form of communication hardware, without requiring a conventional antenna.

Transceivers 616 and 626 can each, independently, be a transmitter, a receiver, or both a transmitter and a receiver, or a unit or device that is configured both for transmission and reception.

Processors 614 and 624 can be embodied by any computational or data processing device, such as a central processing unit (CPU), application specific integrated circuit (ASIC), or comparable device. The processors can be implemented as a single controller, or a plurality of controllers or processors.

Memories 615 and 625 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate therefrom. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as eNB 610 and UE 620, to perform any of the processes described above (see, for example, FIGS. 1-5B). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 6 illustrates a system including an eNB 610 and a UE 620, embodiments of the invention may be applicable to other configurations, and configurations involving additional elements, as illustrated and discussed herein. For example, multiple user equipment devices can be present.

According to certain embodiments, a method includes configuring, with radio resource control signaling, a physical uplink control channel resource to one or more devices. The method also includes indicating to each device of the one or more devices, which part of the resource to use.

The resource can be at least one of a channel quality indicator resource or a scheduling request resource.

The resource can further be at least one of an acknowledgment/negative acknowledgment resource, a precoding matrix indicator resource and a rank indication resource.

The indicating can include indicating with a control information element, such as a medium access control information element.

The indicating the part of the resource to use can include indicating an alternating even or odd half of the resource, a quarter of the resource, or full use of the resource.

The indicating the part of the resource to use can include indicating different parts of the same resource to multiple devices.

The method can include adjusting a periodicity of the resource by allocating partial resources.

The method can also include activating or deactivating an allocation of the resource using at least one of an information element, a medium access control command, or radio resource control signaling.

The method can include activating or deactivating the resource using at least one of an information element, a medium access control command or radio resource control signaling.

The deactivating the allocation of the resource may include forcing a time alignment timer to expire.

The method can further include detecting a change in at least one of network load or traffic status of a device of the one or more devices, and adjusting the resource to use for a device of the one or more devices based on the change.

The method can additionally include time division multiplexing of multiple devices on the same physical uplink control channel resource.

In certain embodiments, an apparatus includes at least one processor and at least one memory including computer program code. The at least one memory and the computer program code are configured to, with the at least one processor, cause the apparatus at least to configure, with radio resource control signaling, a physical uplink control channel resource to one or more devices. The at least one memory and the computer program code are also configured to, with the at least one processor, cause the apparatus at least to indicate to each device of the one or more devices, which part of the resource to use.

The resource can be at least one of a channel quality indicator resource or a scheduling request resource.

The resource can further be at least one of an acknowledgment/negative acknowledgment resource, a precoding matrix indicator resource and a rank indication resource.

The at least one memory and the computer program code can be configured to, with the at least one processor, cause the apparatus at least to indicate the part of the resource to use with a control information element, such as a medium access control information element.

The at least one memory and the computer program code can be configured to, with the at least one processor, cause the apparatus at least to indicate the part of the resource to use by indicating an alternating even or odd half of the resource, a quarter of the resource, or full use of the resource.

The at least one memory and the computer program code can be configured to, with the at least one processor, cause the apparatus at least to indicate the part of the resource to use by indicating different parts of the same resource to multiple devices.

The at least one memory and the computer program code can be configured to, with the at least one processor, cause the apparatus at least to adjust a periodicity of the resource by allocating partial resources.

The at least one memory and the computer program code can be configured to, with the at least one processor, cause the apparatus at least to activate or deactivate an allocation of the resource using at least one of an information element, a medium access control command, or radio resource control signaling.

The at least one memory and the computer program code can be configured to, with the at least one processor, cause the apparatus at least to activate or deactivate the resource using at least one of an information element, a medium access control command or radio resource control signaling.

The at least one memory and the computer program code can be configured to, with the at least one processor, cause the apparatus at least to deactivate the allocation of the resource by forcing a time alignment timer to expire.

The at least one memory and the computer program code can be configured to, with the at least one processor, cause the apparatus at least to detect a change in at least one of network load or traffic status of a device of the one or more devices, and to adjust the resource to use for a device of the one or more devices based on the change.

The at least one memory and the computer program code can be configured to, with the at least one processor, cause the apparatus at least to time division multiplex multiple devices on the same physical uplink control channel resource.

An apparatus, according to certain embodiments, includes configuring means for configuring, with radio resource control signaling, a physical uplink control channel resource to one or more devices. The apparatus also includes indicating means for indicating to each device of the one or more devices, which part of the resource to use.

The resource can be at least one of a channel quality indicator resource or a scheduling request resource.

The resource can further be at least one of an acknowledgment/negative acknowledgment resource, a precoding matrix indicator resource and a rank indication resource.

The indicating can include indicating with a control information element, such as a medium access control information element.

The indicating the part of the resource to use can include indicating an alternating even or odd half of the resource, a quarter of the resource, or full use of the resource.

The indicating the part of the resource to use can include indicating different parts of the same resource to multiple devices.

The apparatus can include adjusting means for adjusting a periodicity of the resource by allocating partial resources.

The apparatus can also include activation means for activating or deactivating an allocation of the resource using at least one of an information element, a medium access control command, or radio resource control signaling.

The activation means can be configured to activate or deactivate the resource using at least one of an information element, a medium access control command or radio resource control signaling.

The deactivating the allocation of the resource may include forcing a time alignment timer to expire.

The apparatus can further include detecting means for detecting a change in at least one of network load or traffic status of a device of the one or more devices, and adjusting the resource to use for a device of the one or more devices based on the change.

The apparatus can additionally include multiplexing means for time division multiplexing of multiple devices on the same physical uplink control channel resource.

A non-transitory computer readable medium is, in certain embodiments, encoded with instructions that, when executed in hardware, perform a process. The process includes configuring, with radio resource control signaling, a physical uplink control channel resource to one or more devices. The process also includes indicating to each device of the one or more devices, which part of the resource to use.

The resource can be at least one of a channel quality indicator resource or a scheduling request resource.

The resource can further be at least one of an acknowledgment/negative acknowledgment resource, a precoding matrix indicator resource and a rank indication resource.

The indicating can include indicating with a control information element, such as a medium access control information element.

The indicating the part of the resource to use can include indicating an alternating even or odd half of the resource, a quarter of the resource, or full use of the resource.

The indicating the part of the resource to use can include indicating different parts of the same resource to multiple devices.

The process can include adjusting a periodicity of the resource by allocating partial resources.

The process can also include activating or deactivating an allocation of the resource using at least one of an information element, a medium access control command, or radio resource control signaling.

The process can include activating or deactivating the resource using at least one of an information element, a medium access control command or radio resource control signaling.

The deactivating the allocation of the resource may include forcing a time alignment timer to expire.

The process can further include detecting a change in at least one of network load or traffic status of a device of the one or more devices, and adjusting the resource to use for a device of the one or more devices based on the change.

The process can additionally include time division multiplexing of multiple devices on the same physical uplink control channel resource.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the scope of the invention.

We claim:

1. A method, comprising:
    transmitting a radio resource control signaling to configure a physical uplink control channel resource to two or more devices, wherein the physical uplink control channel resource is divided evenly into four parts and comprises a channel quality indicator resource and a scheduling request resource; and
    transmitting an indication to each device of the two or more devices, which part of the four parts of the physical uplink control channel resource to use, wherein the indication of the part of the four parts of the physical uplink control channel resource is configured to permit avoidance of contention-based collisions amongst two of the two or more devices, and wherein a period of time for using the indicated part of the physical uplink control channel resource, is adjusted by detecting a traffic load of each one of the two or more devices.

2. The method of claim 1, wherein the physical uplink control channel resource comprises at least one of an acknowledgment/negative acknowledgment resource, a precoding matrix indicator resource and a rank indication resource.

3. The method of claim 1, wherein the indication is transmitted in a control information element.

4. The method of claim 1, wherein the indication of the part of the physical uplink control channel resource to use comprises an indication of an alternating even or odd half of the physical uplink control channel resource, a quarter of the physical uplink control channel resource, or full use of the physical uplink control channel resource.

5. The method of claim 1, wherein the indication of the part of the physical uplink control channel resource to use comprises an indication of different parts of a same resource to multiple devices.

6. The method of claim 1, further comprising: adjusting a periodicity of the physical uplink control channel resource by allocating partial resources.

7. The method of claim 1, further comprising: activating or deactivating an allocation of the physical uplink control channel resource using at least one of an information element, a medium access control command, or radio resource control signaling.

8. The method of claim 1, further comprising:
    activating or deactivating the physical uplink control channel resource using at least one of an information element, a medium access control command or radio resource control signaling.

9. The method of claim 7, wherein the deactivating the allocation of the physical uplink control channel resource comprises forcing a time alignment timer to expire.

10. The method of claim 1, further comprising:
    detecting a change in at least one of network load or traffic status of a device of the two or more devices; and
    adjusting the physical uplink control channel resource to use for a device of the two or more devices based on the change.

11. The method of claim 1, further comprising:
time division multiplexing multiple devices on a same physical uplink control channel resource.

12. A non-transitory computer readable medium encoded with instructions that, when executed in hardware, perform a process, wherein the process comprises the method according to claim 1.

13. An apparatus, comprising:
at least one processor; and
at least one memory including computer program code,
wherein the at least one memory and the computer program code are configured to, with the at least one processor, cause the apparatus at least to
transmit a radio resource control signaling to configure a physical uplink control channel resource to two or more devices, wherein the physical uplink control channel resource is divided evenly into four parts and comprises a channel quality indicator resource and a scheduling request resource; and
transmit an indication to each device of the two or more devices, which part of the four parts of the physical uplink control channel resource to use, wherein the indication of the part of the four parts of the physical uplink control channel resource is configured to permit avoidance of contention-based collisions amongst two of the two or more devices, and wherein a period of time for using the indicated part of the physical uplink control channel resource, is adjusted by detecting a traffic load of each one of the two or more devices.

14. The apparatus of claim 13, wherein the physical uplink control channel resource comprises at least one of an acknowledgment/negative acknowledgment resource, a precoding matrix indicator resource and a rank indication resource.

15. The apparatus of claim 13, wherein the at least one memory and the computer program code are configured to, with the at least one processor, cause the apparatus at least to indicate the part of the physical uplink control channel resource to use with a control information element.

16. The apparatus of claim 13, wherein the at least one memory and the computer program code are configured to, with the at least one processor, cause the apparatus at least to indicate the part of the physical uplink control channel resource to use by indicating an alternating even or odd half of the physical uplink control channel resource, a quarter of the physical uplink control channel resource, or full use of the physical uplink control channel resource.

17. The apparatus of claim 13, wherein the at least one memory and the computer program code are configured to, with the at least one processor, cause the apparatus at least to indicate the part of the physical uplink control channel resource to use by indicating different parts of a same resource to multiple devices.

18. The apparatus of claim 13, wherein the at least one memory and the computer program code are configured to, with the at least one processor, cause the apparatus at least to adjust a periodicity of the physical uplink control channel resource by allocating partial resources.

19. The apparatus of claim 13, wherein the at least one memory and the computer program code are configured to, with the at least one processor, cause the apparatus at least to activate or deactivate an allocation of the physical uplink control channel resource using at least one of an information element, a medium access control command, or radio resource control signaling.

20. The apparatus of claim 13, wherein the at least one memory and the computer program code are configured to, with the at least one processor, cause the apparatus at least to activate or deactivate the physical uplink control channel resource using at least one of an information element, a medium access control command or radio resource control signaling.

21. The apparatus of claim 19, wherein the at least one memory and the computer program code are configured to, with the at least one processor, cause the apparatus at least to deactivate the allocation of the physical uplink control channel resource by forcing a time alignment timer to expire.

22. The apparatus of claim 13, wherein the at least one memory and the computer program code are configured to, with the at least one processor, cause the apparatus at least to detect a change in at least one of network load or traffic status of a device of the two or more devices, and to adjust the physical uplink control channel resource to use for a device of the two or more devices based on the change.

23. The apparatus of claim 13, wherein the at least one memory and the computer program code are configured to, with the at least one processor, cause the apparatus at least to time division multiplex multiple devices on a same physical uplink control channel resource.

* * * * *